June 10, 1924.
A. J. DREMEL
1,497,094
REGISTERING NEST
Filed Dec. 30, 1922
5 Sheets-Sheet 2
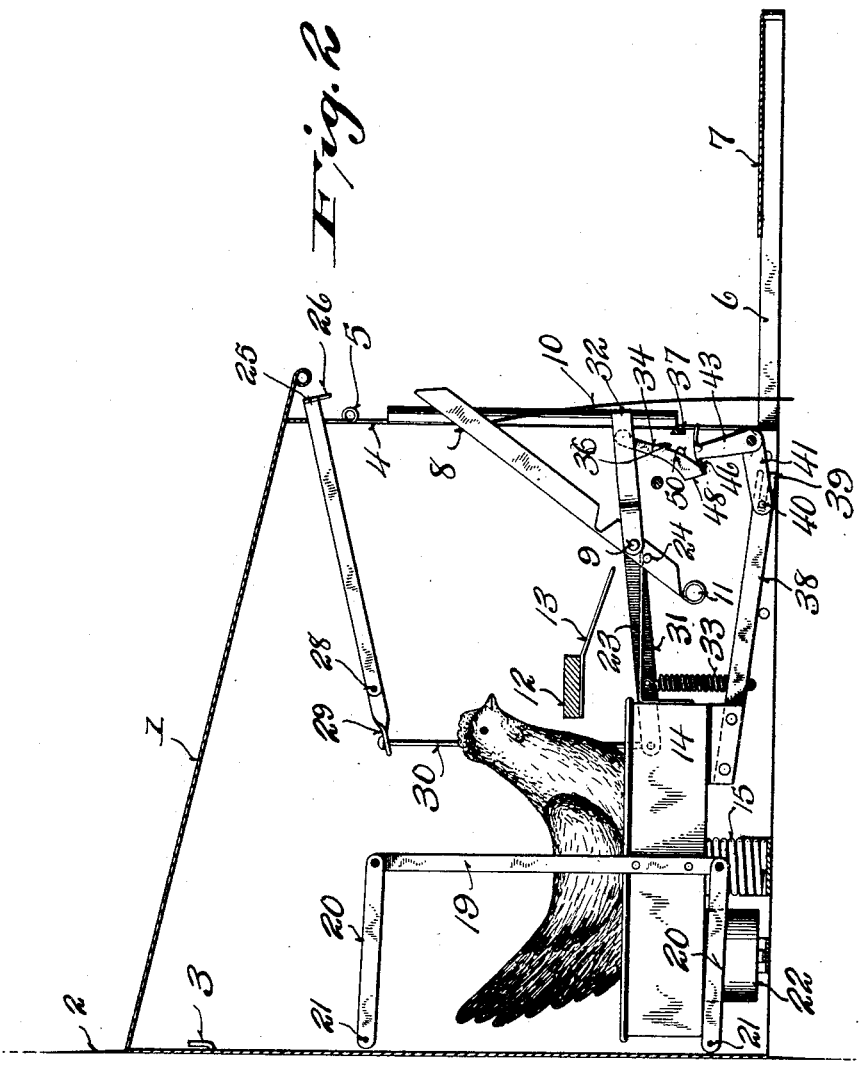

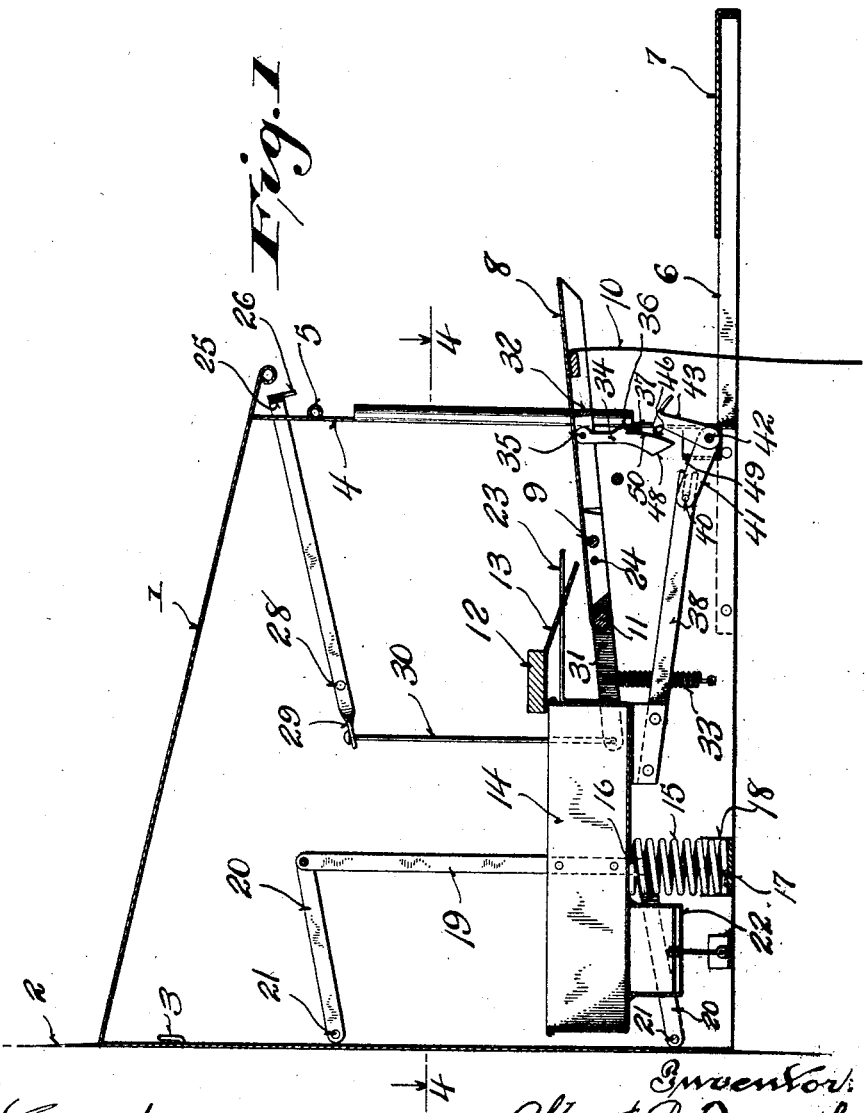

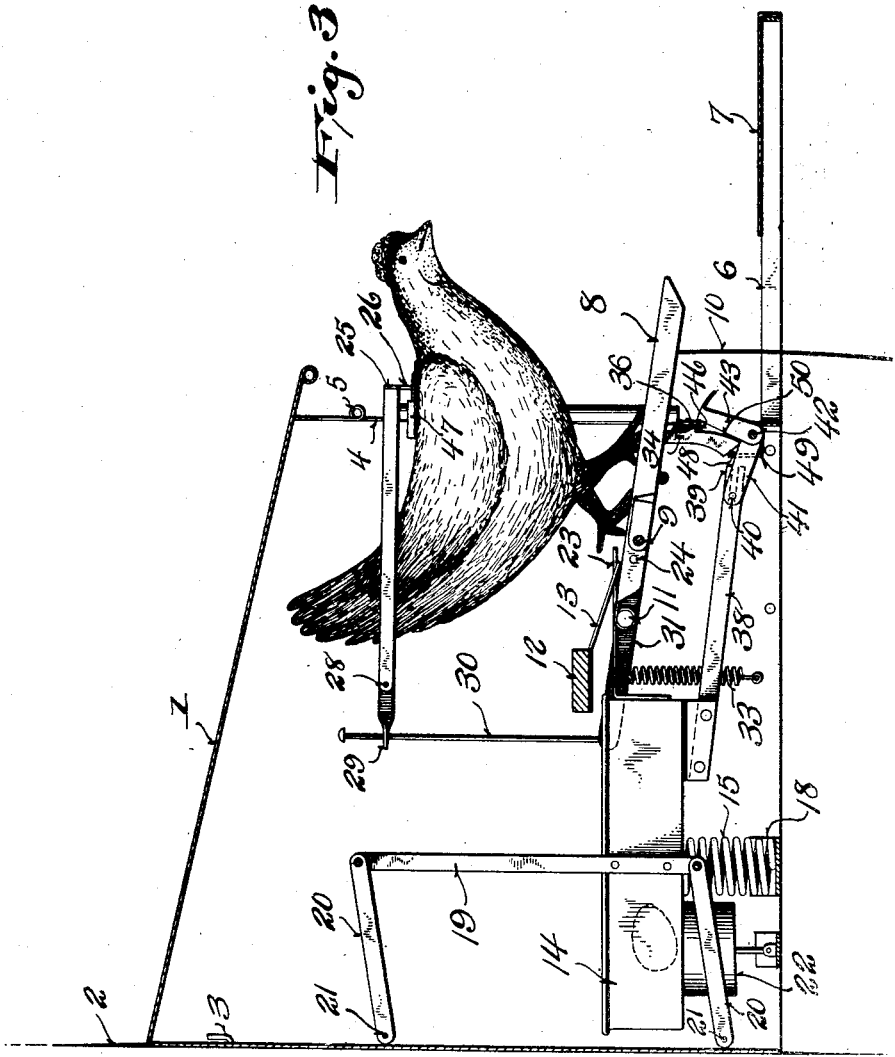

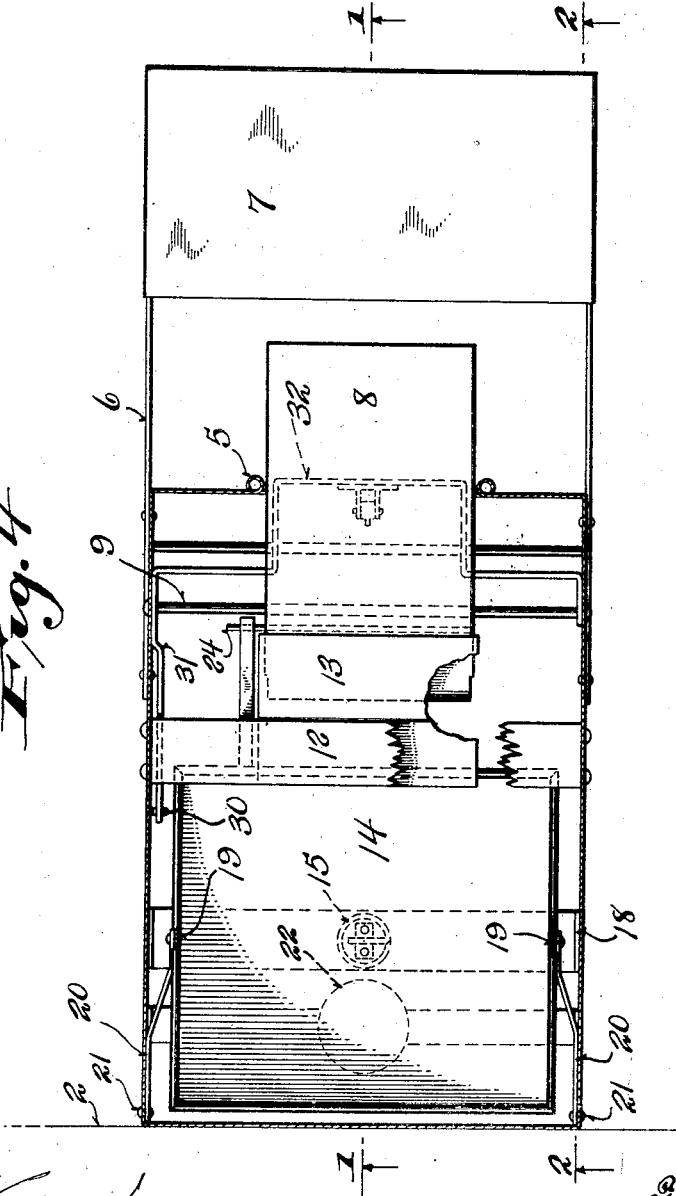

June 10, 1924.
A. J. DREMEL
1,497,094
REGISTERING NEST
Filed Dec. 30, 1922   5 Sheets-Sheet 5
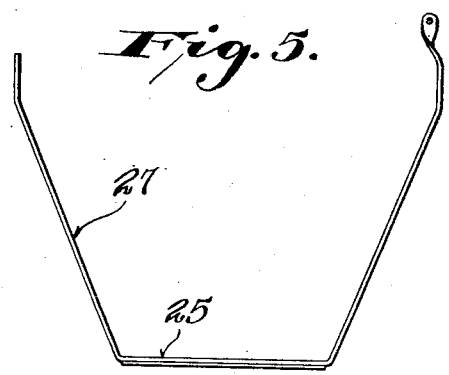
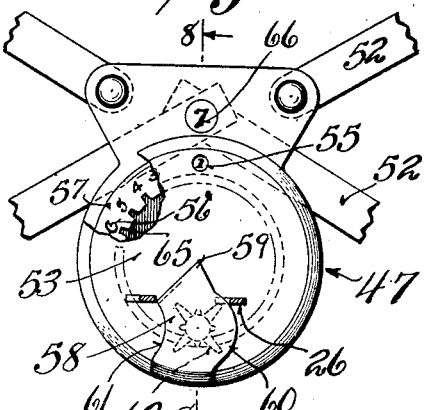
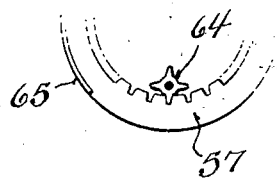
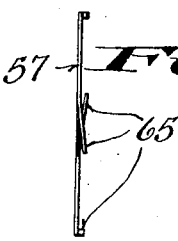
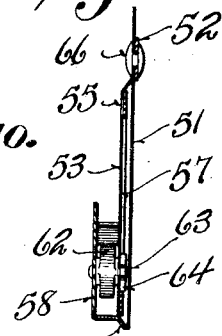
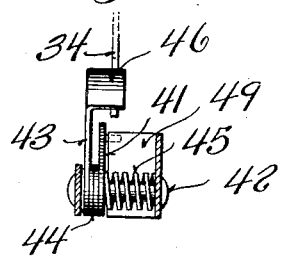
Inventor
Albert J. Dremel Patented June 10, 1924.

1,497,094

UNITED STATES PATENT OFFICE.

ALBERT J. DREMEL, OF RACINE, WISCONSIN.

REGISTERING NEST.

Application filed December 30, 1922. Serial No. 609,935.

*To all whom it may concern:*

Be it known that I, ALBERT J. DREMEL, a citizen of the United States, and resident of Racine, in the county of Racine and State of Wisconsin, have invented certain new and useful Improvements in Registering Nests; and I do hereby declare that the following is a full, clear, and exact description thereof.

This invention relates to registering nests and is particularly directed to an automatic registering nest.

In registering nests as heretofore constructed, difficulty was experienced in keeping accurate register either of the total number of eggs or of the eggs laid by the individual fowls.

There were two main styles of registering nests heretofore, one of which was trap nesting, in which a fowl automatically locked the entrance door and had to be released by the poultry keeper. When the fowl was released, the poultry keeper could examine the nest, and mark upon a card the record of the fowl. This type of recording nest, therefore, placed a severe burden upon the poultry keeper as he was compelled to visit the nests five or six times a day and every day of the year in order to keep an accurate record of the flock.

The other type of registering nest consisted of a housing or other suitable container within which the fowl was supposed to enter. A mechanism was operated at each time the fowl entered the nest and imprinted or otherwise made a record of the entering fowl. Obviously, a fowl might enter a nest without laying, in which case the record would be hopelessly inaccurate.

This invention is designed to overcome the above noted defects, and has therefore for its primary object the provision of an automatic registering nest in which an individual register is automatically kept for each fowl in a manner to indicate not the number of times a fowl enters a nest, but to accurately indicate the number of eggs laid by each particular fowl.

Further objects are to provide an automatic nest in which a mechanism associated with each of the separate fowls cooperates with another mechanism which is normally inactive and only rendered active when an egg is deposited in the nest. To provide a mechanism which will function for a material length of time without requiring the attention of the poultry man and provide a mechanism which does not require an indicator or marker, and therefore avoids the drying up or breaking of the marking instrumentality.

Further objects are to provide an automatic registering nest in which a free and unobstructed passage way is offered the entering fowl, in which the mechanism is not likely to become damaged by the fowl, and is effectively protected at all times, and in which a minimum of discomfort is occasioned the fowl.

Further objects are to provide an automatic registering nest in which a comparatively small number of parts are used, in which the adjustment is extremely simple, which may be manufactured primarily from sheet metal if desired, and which may be cheaply and readily produced.

An embodiment of the invention is shown in the accompanying drawings, in which:—

Figure 1 is an elongated vertical sectional view thru the nest with the parts in their normal position, such view corresponding to a section on the line 1—1 of Figure 4.

Figure 2 is a similar view taken however on the line 2—2 of Figure 4, showing the nest in use.

Figure 3 is a view corresponding to Figure 2, showing a fowl leaving the nest after depositing an egg, and the actuator bar in its operative position, cooperating with the counter carried by the fowl.

Figure 4 is a sectional plan view corresponding to a section on the line 4—4 of Fig. 1.

Figure 5 is a detailed plan view of the actuator bar.

Figure 6 is a front elevation of such bar.

Figure 7 is an enlarged detailed view, partly broken away, of the register or counter adapted to be carried by the fowl.

Figure 8 is a sectional view of the structure shown in Figure 7, such view being taken on the line 8—8.

Figure 9 is a detail of the register.

Figure 10 is a side elevation of the dial ring of the register.

Figure 11 is a detail of the tripping mechanism of the nest, such view being in section and showing the frictional connection between the tripping arm and adjacent members.

The nest is preferably provided with a sheet metal housing 1, adapted to be detachably secured to a side wall 2, by means of hooks or other suitable fastening element 3, in a position above the floor level to thereby provide an unobstructed floor space. This housing may be of any desired shape, such as that shown in the drawings, for instance, and is preferably provided with a removable top or side. It is provided with a doorway 4, equipped with beaded or rounded margins 5, along its side and top edges to guide the entering and leaving fowl thru a somewhat restricted space. The outer portion of the nest is provided with extension arms 6, across which a perch or platform 7, may be secured. This platform is designed to receive the fowl when it jumps for the nest, thereby preventing unnecessary jarring of the apparatus. A platform 8, is pivotally mounted upon a transverse supporting rod 9, and projects thru the doorway 4. The outer end of the platform may carry a flexible pendant sheet 10, adapted to protect portions of the mechanism in all positions of the pivoted platform. The rear portion or inner portion of this pivoted platform may be provided with a counter weight 11, to properly balance the forwardly extending portion of the platform, although such forwardly extending portion has the preponderant weight and consequently the platform normally remains in the position shown in Figure 1.

To the rear of this platform a second stationary perch 12, is provided and may be equipped with a forwardly and downwardly extending stationary protecting apron 13. To the rear of this perch or member 12, the nest portion 14 is positioned. This nest may consist of a relatively shallow sheet metal box, which is normally held in the position shown in Figure 1 by means of one or more scale springs 15, whose upper end is received in a suitable eyelet 16, secured to the nest portion and whose lower end may be secured by a corresponding eyelet 17, and a cup-shaped member 18 if desired. The nest is guided in its vertical motion by means of parallel motion mechanism, comprising a pair of vertical arms 19, rigidly secured to opposite sides of the nest and having their upper and lower ends pivotally attached to levers 20, whose stationary ends are pivotally mounted as indicated at 21, adjacent the rear inner portion of the housing 1 and preferably to the side walls as indicated in Figures 1 to 4. The upward limit of movement of the nest 14 may be determined in any manner, either by the proper proportioning of the spring 15 or by means of the stationary transverse member 12, as shown in Figure 1. Its upward motion is retarded by any suitable means, as for example, a dash-pot 22.

From the mechanism thus far described, it may be seen that a fowl may alight upon the platform 7, step upon the pivotally mounted platform 8, enter the housing, step upon the perch 12 and seat itself within the nest portion 14. As the nest descends, due to the weight of the fowl, a forwardly projecting arm 23, contacts with a pin 24, carried by the platform 8, and rocks the platform upwardly as indicated in Figure 2, thereby closing the doorway and preventing a second fowl from entering the nest while it is occupied.

An actuator bar which may take the form illustrated in Figures 5 and 6 is positioned across the upper front portion of the nest as indicated at 25, and is provided with a plurality of outwardly and laterally projecting comb teeth 26. The arm may be provided with divergent side arms 27, pivoted at 28 upon the inner side walls of the housing 1. One of the arms is provided with an aperture thru which a headed link or rod 30 freely passes. The lower end of the rod is pivotally joined to the inner end of a lever 31. This lever extends forwardly along the inner side walls of the housing and is pivotally mounted upon the rod 9, which supports the platform 8. It is equipped with a forward U-shaped portion 32, positioned beneath the platform 8, and adapted to be depressed by the platform. The rear portion of this lever 31, is held in its lowest position as indicated in Figure 1, by means of a spring 33. The teeth 26 carried by the actuator bar 25, are adapted to cooperate with suitable portions of register hereinafter described, which are carried by the individual fowls. It is however to be understood that the registers are not operated unless the actuator 25 is in its depressed position as indicated in Figure 3.

In order to prevent the depression of the actuator bar by the weight of the fowl upon the platform, 8, when an egg has not been deposited in the nest, a latch 34 is loosely pivotally mounted as at 35, upon the under side of the platform 8, and hangs downwardly as indicated in Figure 1. It is provided with a lip 36, which normally engages a transverse correspondingly shaped bar 37, rigidly attached to a portion of the housing as below the platform 8. When the nest is in the position shown in Figure 1, the latch will prevent depression of the platform 8. However, when an egg has been deposited in the nest as indicated in Figure 3, the nest will not assume its normal position, but remains slightly depressed as illustrated in such figure. This position or motion of the nest is transmitted to a trip mechanism by means of an arm 38, rigidly attached to the nest and provided with a forked arm 39. This arm engages upon a pin 40, which is carried by a lever 41, pivotally mounted upon a pin 42, carried by the housing. The lever 41 is in operative engagement with a second lever 43, thru the medium of a plurality of friction washers 44, if desired. These are held in their proper position by means of a light spring 45, as may be seen in Figure 11. The upper portion of the trip lever 43, is provided with an arcuate portion 46. It will be seen that when the nest is depressed by the weight of an egg, as illustrated in Figure 3, that the lever 43 is rocked inwardly, thereby moving the latch 34 out of its engaging position and permitting the platform 8 to be depressed by the weight of the fowl. This motion of the platform is transmitted to the link or rod 30. The actuator bar 25 is accordingly lowered as indicated in Figure 3, and the comb fingers are consequently in a position to be engaged by suitable portions of the counter 47, strapped upon the back of the fowl. It is to be noted that the connections between the rear portion 29, of the actuator and the rod 30, permits the actuator to freely adjust itself to the fowl's back. In fact, such actuator rides slightly upon the back of the fowl while such fowl is passing outwardly thru the doorway as indicated in Figure 3.

It is obviously necessary to reset the lever 43 of the trip mechanism so that after a cycle of operations, it will occupy its initial position as indicated in Figure 1, irrespective of the weight of the eggs in the nest. This is readily accomplished by the resetting mechanism illustrated in Figures 1 and 3. This resetting mechanism may comprise a cam 48, formed upon the lower portion of the latch 34, and a cooperating shoulder or portion 49, carried by the housing. When the platform 8 is depressed as indicated in Figure 3, the cam surface 48 contacts with the member 49 and causes the latch 34 to move forwardly slightly. The outer surface 50 of the latch cooperates with the inner end of the arcuator portion 46 of the lever 43 and rocks the lever 43 forwardly with reference to the lever 41, the frictional connection between such levers permitting this motion. The angular change between the levers 43 and 41 is proportional to the downward displacement of the nest, corresponding to the weight remaining in the nest, as is obvious from an inspection of Figure 3. When the platform 8 again rises, it will be found that the arcuate portion 46, of the lever 43, lightly contacts with the surface 50 of the latch while such latch is in the locking position indicated in Figure 1. The mechanism is thus reset automatically.

One of the counters, 47, is illustrated in Figures 7 to 10 inclusive. It may comprise a base portion 51, to which are attached straps 52, adapted to be secured around the wings of the fowl, with the back or base portion 51, resting upon the back of the fowl. A cover 53, is secured to the back portion and is provided with tapered marginal surfaces 54, over which the comb teeth 26, may freely ride. It is further provided with a hole 55, thru which one of the numbers 56, carried by a registering annular ring 57, may be viewed. A guiding tongue 58, projects across the portion of the upper or cover plate 53, and is provided with a pointed forward edge 59, adapted to enter between adjacent teeth 26 of the actuator. One side of this guide is outwardly bulged or rounded as indicated at 60, and the opposite side is correspondingly inwardly curved as indicated at 61, so as to cause the comb teeth to travel in the arc of a circle for a limited definitely defined distance. Between the guide 58 and the cover 53, a star wheel 62 is mounted and is carried by a pin or shaft 63, which projects inwardly into the space between the cover 53, and the base or inner portion 51 of the counter. The arms of the star wheel 62 are adapted to be successively engaged by a comb tooth 26, as indicated in Figure 7, when the fowl leaves the nest after depositing an egg therein, as may be seen from Figures 3 and 7—Figure 7 being, as previously described, an enlarged detailed view of the counter showing such counter in the position it occupies in Figure 3 in reference to one of the comb teeth 26. The inner end of the shaft 63 carries a small pinion 64, which cooperates with the internal teeth 65 of the registering ring 57. A convenient way of maintaining the ring in its proper position is by means of a plurality of spring arms 65, stuck up from equally spaced portions of its margin, as may be seen from Figures 9 and 10. If desired, each of the counters or register may be separately numbered as indicated at 66, in Figure 7.

The operation of the device has been given in detail but will be briefly summarized herewith. A fowl in entering the nest is unable to depress the platform 8, due to the operation of the latch. However, upon leaving the nest, when an egg has been deposited therein, the weight of the fowl depresses the platform 8 as the latch has been rocked rearwardly by the arcuate portion 46, of the tripping mechanism, and upon continued outward motion of the platform 8, the tripping mechanism is set, so that it is again ready for the next operation. When the platform 8 is depressed, the actuator 25 is allowed to move downwardly and to ride loosely upon the fowl's back as indicated in Figure 3. The guide 58, (see Figure 7) of the register will enter between some pair of the comb teeth 26, and one of the comb teeth will be suitably guided and caused to engage a tooth of the star wheel 62, thereby rocking such wheel thru a definite portion of a revolution. This, thru the gearing, causes the registering ring 57, to move to the next higher number, thereby accurately registering the egg and crediting it to the proper fowl.

However, if a fowl leaves the nest without depositing an egg therein, the arcuate member 46 of the tripping mechanism moves forwardly a distance sufficient to clear the latch 34 and leave the latch in this position, consequently the platform 8 will not be depressed and the actuator bar will remain in its inoperative position as indicated in Figure 1, thereby preventing actuation of the register.

It will further be seen that by the peculiar arrangement of the mechanism, an unobstructed and free passage way is afforded, so that the fowls will have no hesitancy in entering the nest. It is also to be noted that the mechanism, although performing relatively delicate functions, is nevertheless of a simple and sturdy construction and of a relatively small number of parts.

Although one form of the invention has been described in considerable detail, it is to be understood that the invention may be embodied in different forms and is, therefore, to be limited only as set forth in the appended claims.

I claim:

1. A registering nest comprising a movable egg receiving portion adapted to be depressed by the weight of an egg, an actuating member controlled by the egg receiving portion and adapted to move from inoperative to operative position for registering the number of eggs of a particular fowl, and a counter adapted to be carried by said fowl and operated by said actuator when said actuator is in operative position.

2. A registering nest comprising a yieldingly supported nest portion, an actuator normally held in inoperative position, mechanism actuated by the weight of a fowl when leaving said nest portion for moving said actuator to operative position, a latch for temporarily preventing movement of said actuator, means operated by said nest portion and adjustably connected thereto for tripping said latch, means for operating said tripping means, and a register adapted to be strapped upon the back of a fowl and to cooperate with said actuator when said actuator is in operative position.

3. A registering nest comprising a yieldingly mounted nest portion adapted to be depressed by the weight of an egg, and actuator bar normally held in inoperative position, a movable platform adapted to temporarily support a fowl when leaving said nest portion, mechanism connecting said actuator bar and platform, a latch for preventing movement of said bar, a trip frictionally connected with said nest portion and adapted to release said latch when said nest is depressed, means for operating said trip upon depression of said platform, and a counter adapted to be strapped upon the back of said fowl and adapted to cooperate with said bar to register the number of eggs laid by said fowl.

4. A registering nest comprising a housing having a doorway, a nest portion yieldingly mounted within said housing and adapted to be depressed by the weight of an egg, an actuator bar adapted to be moved across the upper portion of said doorway and provided with a plurality of comb-like teeth, means controlled by the position of said nest for controlling the motion of said actuator bar, and a register adapted to be strapped to the back of a fowl and including registering means and a star wheel adapted to cooperate with one of said teeth when said actuator bar is positioned across said doorway to register the number of eggs laid by said fowl.

5. In combination, a register adapted to be carried by a fowl and independent stationary mechanism operated by the weight of an egg for actuating said register.

6. A registering nest comprising a portion adapted to be operated by an egg, an actuating member controlled by the egg operated portion and adapted to move from inoperative to operative position for registering the number of eggs of a particular fowl, and a counter adapted to be carried by said fowl and operated by said actuating member when said actuating member is in operative position.

In testimony that I claim the foregoing I have hereunto set my hand at Milwaukee, in the county of Milwaukee and State of Wisconsin.

ALBERT J. DREMEL.